United States Patent
Meister

(10) Patent No.: US 7,912,605 B2
(45) Date of Patent: Mar. 22, 2011

(54) METHOD AND DEVICE FOR TRIGGERING A REVERSIBLE OCCUPANT PROTECTION FUNCTION IN A MOTOR VEHICLE

(75) Inventor: Dirk Meister, Moeglingen (DE)

(73) Assignee: Robert Bosch GmbH, Stuttgart (DE)

( * ) Notice: Subject to any disclaimer, the term of this patent is extended or adjusted under 35 U.S.C. 154(b) by 916 days.

(21) Appl. No.: 11/795,542

(22) PCT Filed: Dec. 6, 2005

(86) PCT No.: PCT/EP2005/056527
§ 371 (c)(1),
(2), (4) Date: Jul. 17, 2007

(87) PCT Pub. No.: WO2006/076986
PCT Pub. Date: Jul. 27, 2006

(65) Prior Publication Data
US 2008/0114512 A1    May 15, 2008

(30) Foreign Application Priority Data
Jan. 18, 2005    (DE) .......................... 10 2005 002 241

(51) Int. Cl.
*G62D 6/00*    (2006.01)
(52) U.S. Cl. ........................................................ 701/41
(58) Field of Classification Search ............... 701/45–48, 701/41; 180/6.2; 280/734–735
See application file for complete search history.

(56) References Cited

U.S. PATENT DOCUMENTS

| | | | |
|---|---|---|---|
| 6,370,461 B1 | 4/2002 | Pierce et al. | |
| 7,668,633 B2 * | 2/2010 | Diebold et al. | 701/36 |
| 2008/0319615 A1 * | 12/2008 | Bernzen et al. | 701/45 |
| 2009/0024282 A1 * | 1/2009 | Roehm et al. | 701/45 |

FOREIGN PATENT DOCUMENTS

| | | |
|---|---|---|
| DE | 198 11 865 | 9/1999 |
| DE | 103 03 149 | 7/2004 |
| DE | 103 17 640 | 11/2004 |

* cited by examiner

*Primary Examiner* — Yonel Beaulieu
(74) *Attorney, Agent, or Firm* — Kenyon & Kenyon LLP

(57) ABSTRACT

A method for triggering a reversible occupant safety function in a motor vehicle, in which the value of a triggering parameter is determined, the value of the triggering parameter is compared with a predetermined threshold value, and the occupant protection function is triggered when the predetermined threshold value is exceeded by the value of the triggering parameter. An aspect of the method is that the threshold value is influenced by a driving style parameter determined by analysis of the brake and/or gas pedal operating procedures and/or by an operating element operable by the driver.

11 Claims, 1 Drawing Sheet

METHOD AND DEVICE FOR TRIGGERING A REVERSIBLE OCCUPANT PROTECTION FUNCTION IN A MOTOR VEHICLE

FIELD OF THE INVENTION

The present invention relates to a method for triggering a reversible occupant protection function in a motor vehicle.

BACKGROUND INFORMATION

German Patent document no. DE 103 03 149 A1 discusses a method for making a deployment decision for a restraint system in which the deployment decision is formed as a function of a linkage of the transverse vehicle acceleration and a yaw rate. The transverse acceleration of the vehicle is additionally subjected to a threshold decision, the respective threshold value being adjusted as a function of at least one component of a center-of-gravity speed of the vehicle.

SUMMARY OF THE INVENTION

The exemplary embodiment and/or exemplary method of the present invention relates to a method for triggering a reversible occupant protection function in a motor vehicle
  in which the value of a triggering parameter is determined,
  the value of the triggering parameter is compared with a predetermined threshold value and
  the occupant protection function is triggered as a function of the comparison, e.g., when the value of the triggering parameter exceeds a predetermined threshold value.
An important aspect of the exemplary embodiment and/or exemplary method of the present invention is that
  the threshold value is influenceable by the driver and/or by his driving performance.
The threshold value is influenced in particular
  by a driving style parameter determined by analysis of the brake and/or gas pedal operating procedures and/or
  by an operating element operable by the driver.
This permits individual adaptation of the threshold values to the driver's comfort range. The driving style parameter represents the driver's driving performance.

In an exemplary embodiment of the present invention, the triggering parameter is the transverse acceleration of the motor vehicle. Since a transverse acceleration sensor is already present in many vehicle dynamics regulating systems, the exemplary embodiment and/or exemplary method of the present invention may be implemented in this way without additional sensors.

In an exemplary embodiment of the present invention,
  the threshold value is predetermined by the driver via an operating element, the driver being able to select, i.e., differentiate, between at least two different finite threshold values or
  the threshold value is predetermined by analysis of the driving style parameter determined based on the brake and/or gas pedal operating procedures, the threshold value being able to assume at least two different finite values.
In this context, the term "finite threshold value" refers to a threshold value that is not infinitely large.

In an exemplary embodiment of the present invention, the reversible occupant protection function is
  an automatic closing of at least one window or
  an automatic closing of the sun roof or
  an adjustment of the head rest position or
  a tightening of reversible seat belt tighteners or
  a raising of the back rests or
  an intervention in the vehicle dynamics, e.g., a brief warning braking.
Due to the reversibility of the triggered occupant protection function, the exemplary embodiment and/or exemplary method of the present invention may at the same time be used for triggering a warning signal to the driver. This warning signal, i.e., automatic closing of the windows or the sun roof, for example, reminds the driver to modify his driving style.

Furthermore, the exemplary embodiment and/or exemplary method of the present invention relates to a device for triggering a reversible occupant protection function in a motor vehicle, including
  a determination arrangement for determining the value of a triggering parameter,
  a comparator arrangement in which the value of the triggering parameter is compared with a predetermined threshold value and
  a triggering arrangement in which the occupant protection function is triggered as a function of the comparison (e.g., when the value of the triggering parameter exceeds the predetermined threshold value).
An important aspect of the device according to the present invention is that the threshold value is influenceable by the driver, i.e., an arrangement, apparatus or structure is provided to allow the driver to influence the threshold value.

In the arrangement for influencing the threshold value in particular, this threshold value is influenced
  by a driving style parameter determined by analysis of the brake and/or gas pedal operating procedures and/or
  by an operating element operable by the driver.
The exemplary methods according to the present invention are also manifested as advantageous embodiments of the device according to the present invention and vice-versa.

DETAILED DESCRIPTION

A comfort range may be observed within the driving behavior of most motor vehicle drivers. This comfort range is based on accelerations tolerable for the driver without feeling unsafe or uncomfortable. The particular limiting values for transverse acceleration and longitudinal acceleration are different and also depend on speed. As an example of the dependence of the transverse acceleration comfort limit on speed, it may be pointed out that a driver will safely execute a swerving or turning maneuver involving a transverse acceleration of 0.5 g at low speeds but will not have the confidence to perform such a maneuver at a high speed (e.g., 180 km/h). The same is true for longitudinal acceleration. The typical driver will be comfortable with a longitudinal acceleration much greater than 0.5 g at low speeds, but most drivers experience anxiety with full deceleration at high speeds. In these references, g refers to the acceleration due to gravity, where $g \approx 9.81$ m/s$^2$.

The present invention provides a method in which actions that increase driving safety are initiated when the driver is driving above his comfort limits. In this case, an increased risk of an accident is assumed and actions to increase the safety of the occupants of the vehicle are implemented. These actions include, for example
  closing the windows, closing the sun roof,
adjusting the head rest position,
tightening reversible seat belt tighteners,
raising the back rests, and
intervening in the vehicle dynamics.

The goal of these actions is not only to increase the safety of occupants but also to inform the driver of the criticality of the situation. The actions listed above as examples may be activated individually or together. Furthermore, the type and number of actions may be scaled to the extent to which the driver is driving above his comfort limits, i.e., safety limits.

Figure 1:
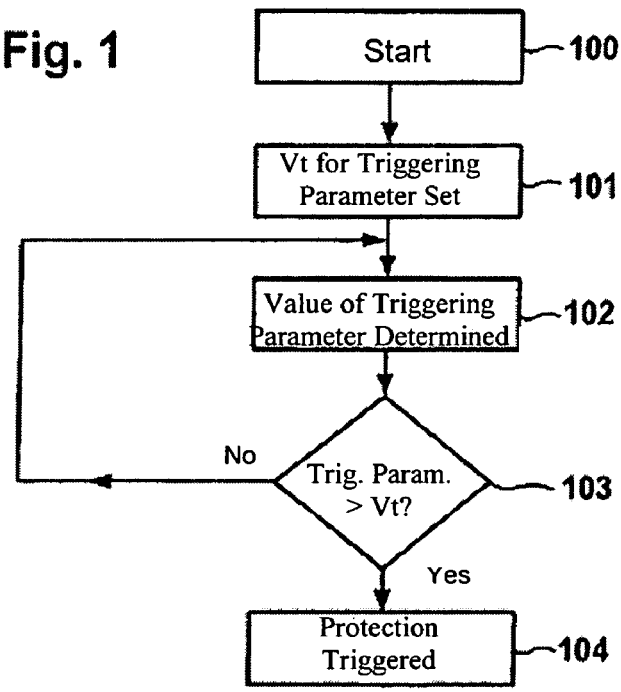
FIG. 1 shows the sequence of the exemplary methods according to the present invention.

The sequence of the method according to the present invention is depicted in FIG. 1. After the start of the method in block 100, the threshold value for the triggering parameter is set in block 101 by the driver himself or is set automatically on the basis of an analysis of driving performance (e.g., automatic detection and classification of the driver's driving style). In block 102, the value of a triggering parameter is then determined. In block 103 the value of the triggering parameter is compared with a predetermined threshold value. If the predetermined threshold value is exceeded by the value of the triggering parameter, the occupant protection function is triggered in block 104. If the threshold value is not exceeded, the process branches back to block 102.

Figure 2:
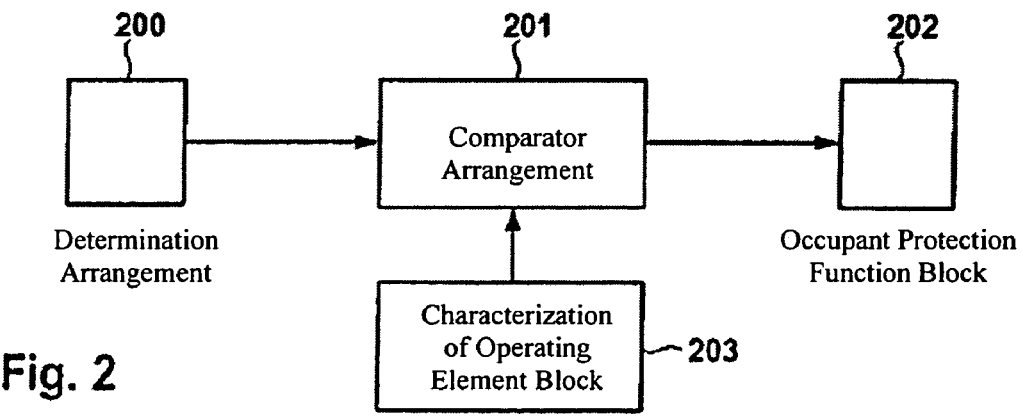
FIG. 2 shows the arrangement of the exemplary device according to the present invention.

FIG. 2 shows the design of the device according to the present invention. Block 200 represents the determination arrangement for determining the value of a triggering parameter. This value is sent to comparator arrangement 201, where the value of the triggering parameter is compared with a predetermined threshold value. Depending on the comparison (e.g., if the predetermined threshold value is exceeded by the value of the triggering parameter), occupant protection function 202 is activated in the sense of a deployment. Block 203, for example, characterizes an operating element via which the driver is able to predetermine the threshold value, select it from a predetermined quantity or influence it. However, block 203 may also be designed as a driving style determination arrangement in which the threshold value is automatically determined by analyzing the driver's driving style (e.g., by analyzing the driver's brake or gas pedal operating procedures).

What is claimed is:

1. A method for triggering a reversible occupant protection function in a motor vehicle, the method comprising:
   determining a value of a triggering parameter;
   comparing the value of the triggering parameter with a predetermined threshold value; and
   triggering the occupant protection function as a function of the comparing;
   wherein the threshold value is influenced by a driving style parameter determined by analysis of at least one of a brake operating procedure, a gas pedal operating procedure and an operating element operable by the driver.

2. The method of claim 1, wherein the triggering parameter is a transverse acceleration of the motor vehicle.

3. The method of claim 1, wherein the threshold value is predetermined by one of:
   the driver via the operating, element, at least two different finite threshold, values being driver selectable, and
   analyzing a driving style parameter as determined based on at least one of the brake operating procedure and the gas pedal operating procedure, the threshold value assuming at least two different finite values.

4. The method of claim 1, wherein the reversible occupant protection function includes one of the following:
   an automatic closing of at least one window,
   an automatic closing of a sun roof,
   an adjustment of a head rest position,
   a tightening of a reversible seat belt tightener,
   a raising of a back rest, and
   an intervention in vehicle dynamics.

5. The method of claim 1, wherein the occupant protection function is triggered when the predetermined threshold value is exceeded by the value of the triggering parameter.

6. A device for triggering a reversible occupant protection function in a motor vehicle, comprising:
   a determining arrangement to determine a value of a triggering parameter;
   a comparing arrangement to compare the value of the triggering parameter with a predetermined threshold value;
   an arrangement to trigger the occupant protection function as a function of the comparing; and
   an influencing arrangement to influence the threshold value, in which the threshold value is influenced by a driving style parameter determined by analyzing at least one of a brake operating procedure, a gas pedal operating procedure, and an operating element operable by the driver.

7. The device of claim 6, wherein the triggering parameter is a transverse acceleration of the motor vehicle.

8. The device of claim 6, wherein the threshold value is predetermined by:
   the driver via an operating element, at least two different finite threshold values being driver selectable, and
   analyzing a driving style parameter as determined based on at least one of the brake operating procedure and the gas pedal operating procedure, the threshold value assuming at least two different finite values.

9. The device of claim 6, wherein the reversible occupant protection function includes one of the following:
   an automatic closing of at least one window,
   an automatic closing of a sun roof,
   an adjustment of a head rest position,
   a tightening of a reversible seat belt tightener,
   a raising of a back rest, and
   an intervention in vehicle dynamics.

10. The method of claim 4, wherein the reversible occupant protection function simultaneously warns the driver to modify the driving style.

11. The method of claim 9, further comprising simultaneously warning the driver through the reversible occupant protection function to modify the driving style.

* * * * *